Aug. 30, 1966 R. J. BILLETT ET AL 3,269,300
STRAPPING MACHINE
Filed Dec. 29, 1964 4 Sheets-Sheet 2
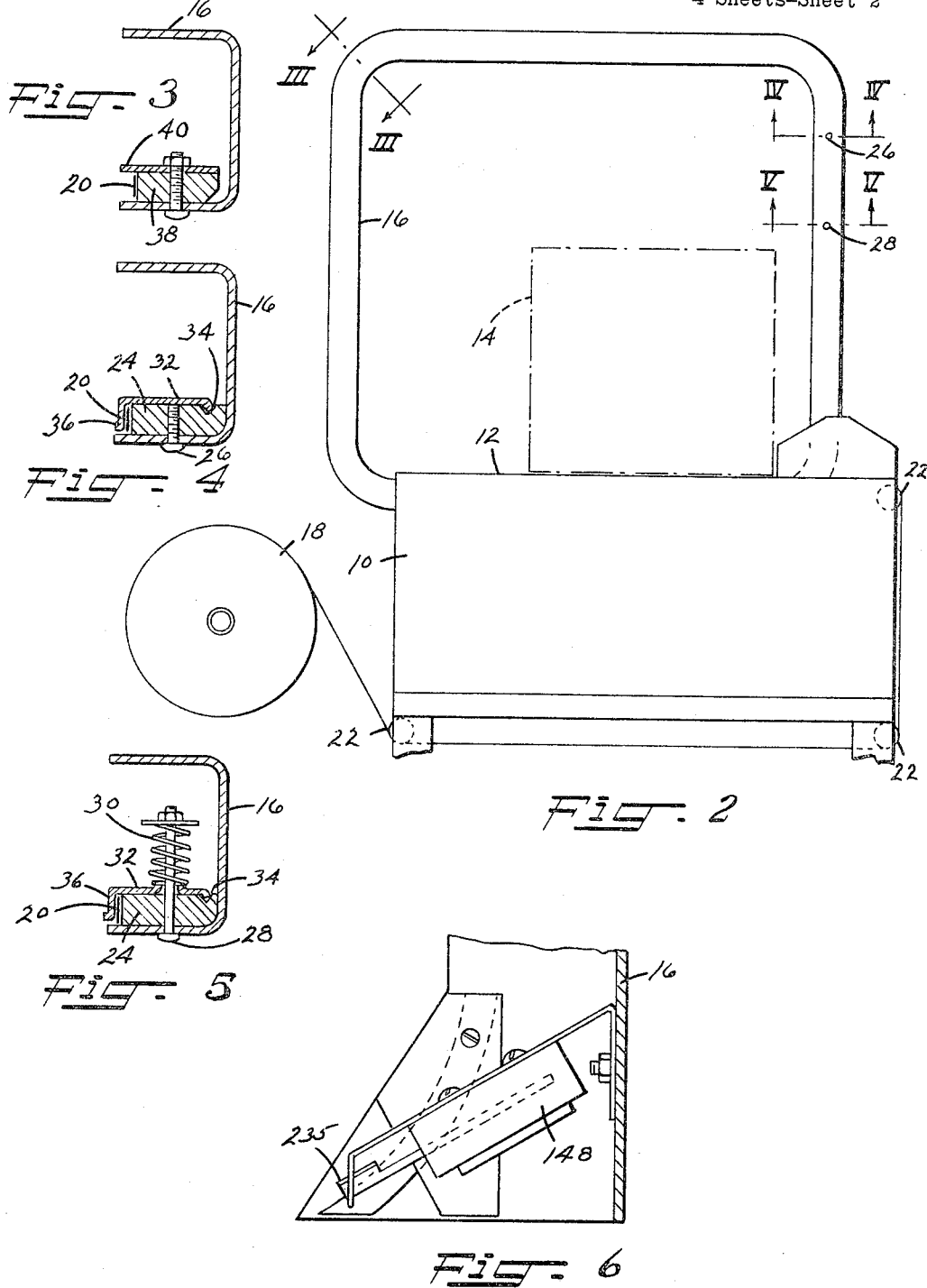

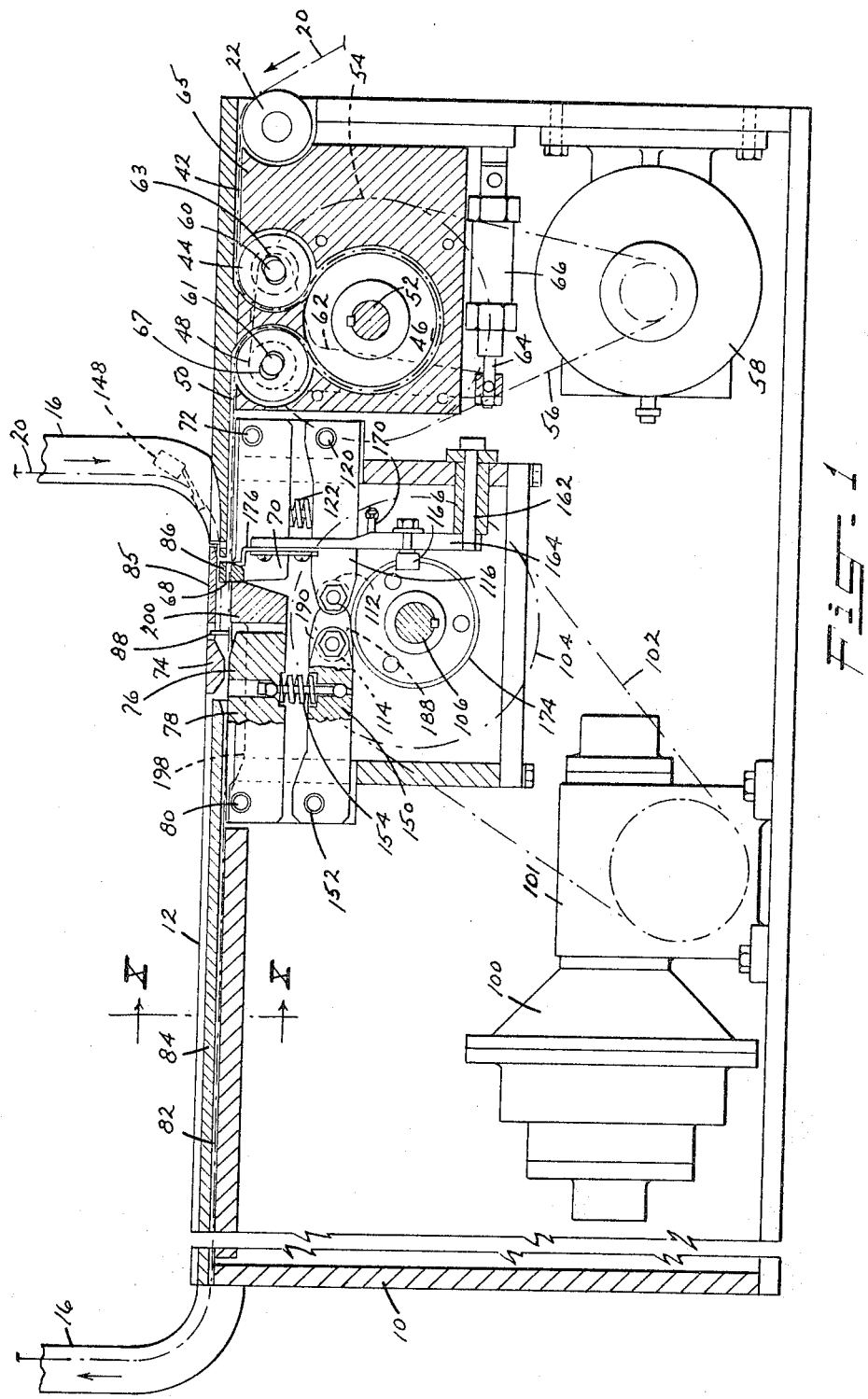

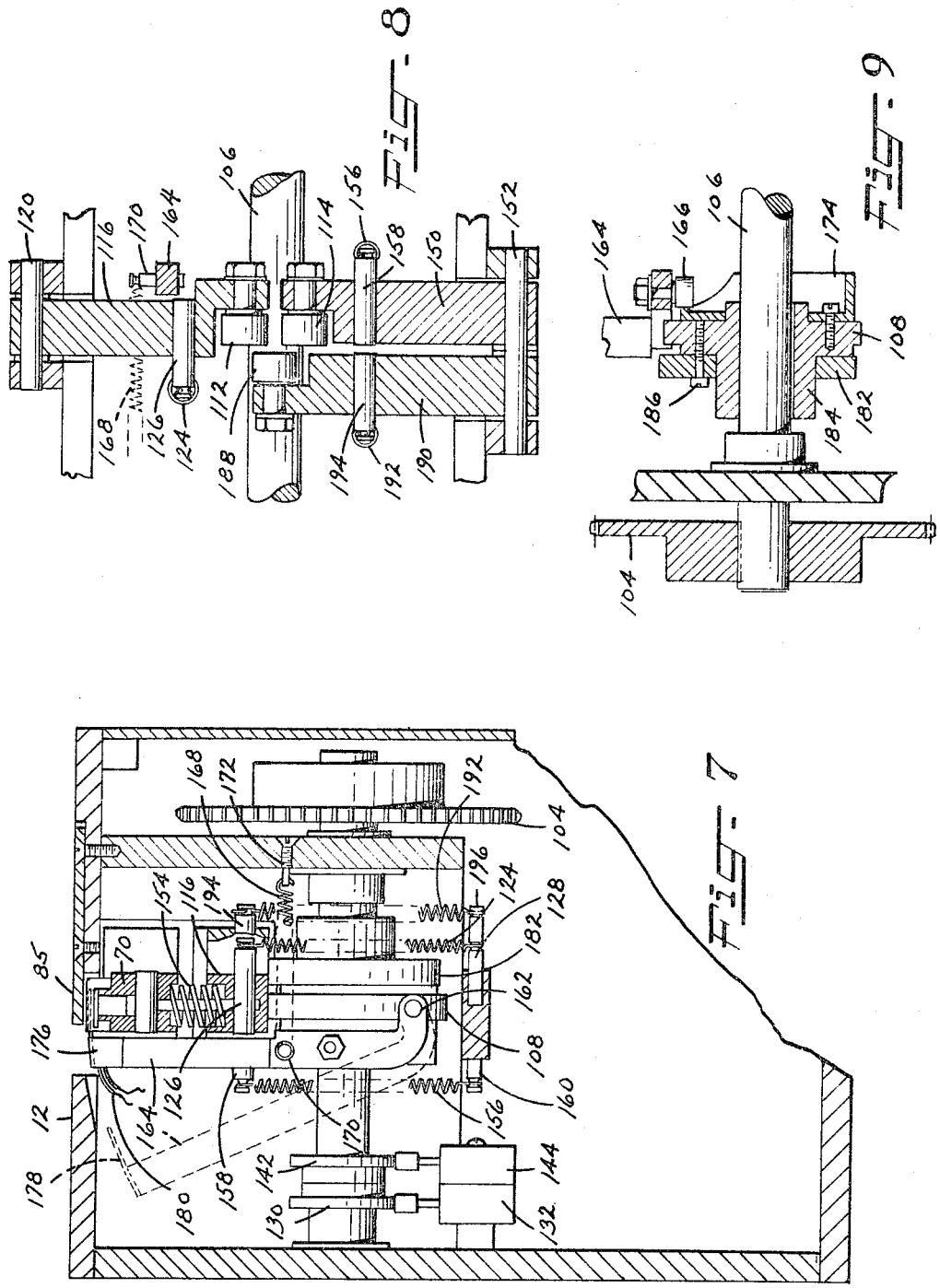

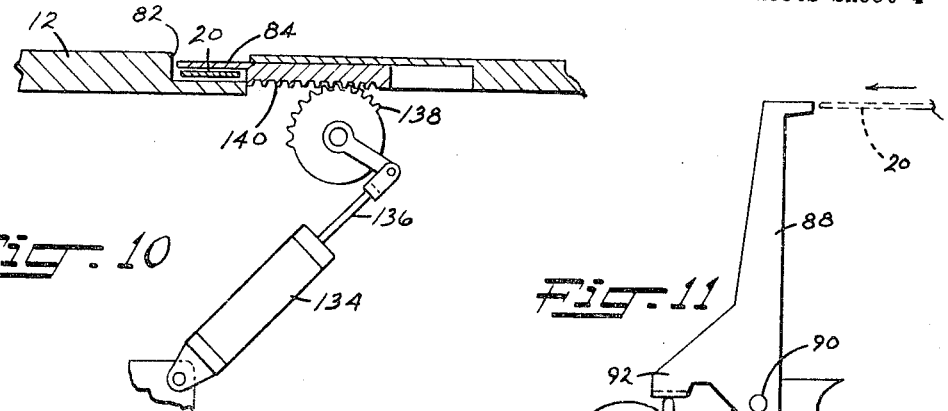
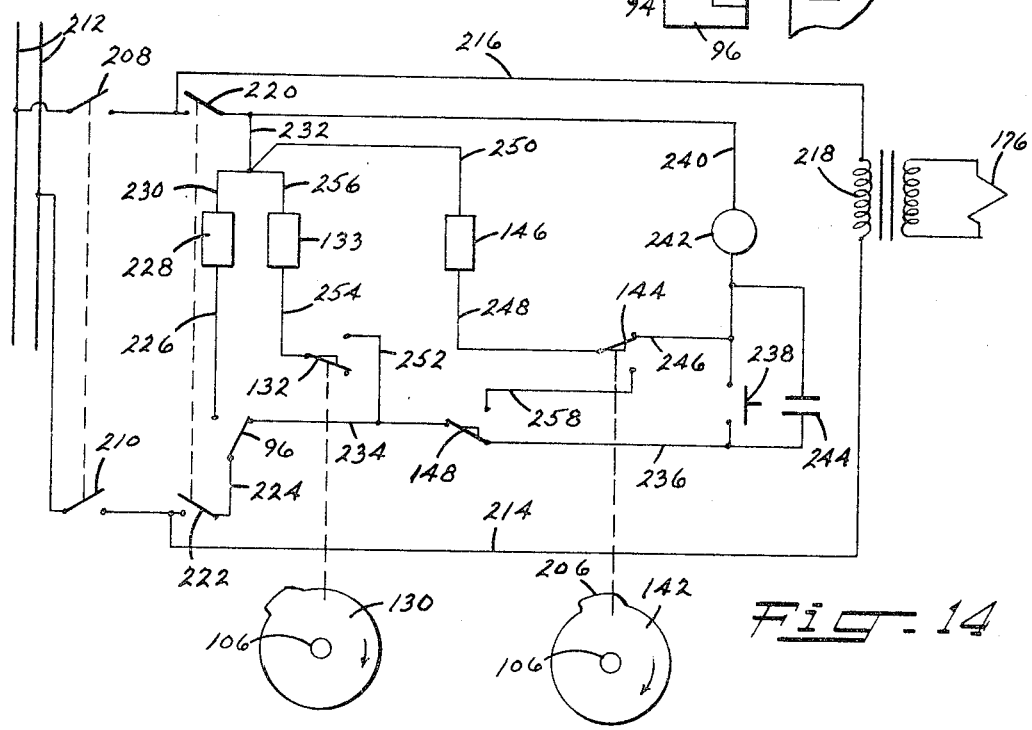
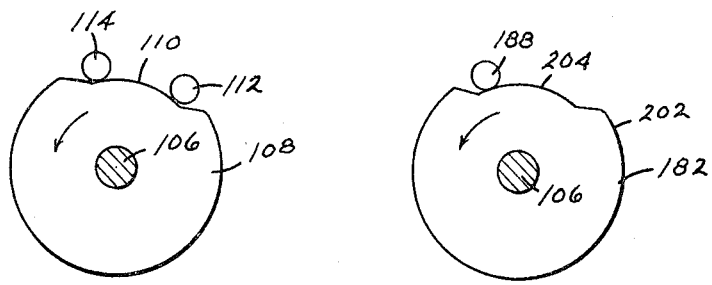

United States Patent Office 3,269,300
Patented August 30, 1966

3,269,300
STRAPPING MACHINE
Ronald J. Billett, Sunnyvale, and Terence H. West, San Jose, Calif., assignors to FMC Corporation, Philadelphia, Pa., a corporation of Delaware
Filed Dec. 29, 1964, Ser. No. 421,883
15 Claims. (Cl. 100—8)

This invention relates to a machine for binding bundles, boxes, packages and the like with a tensioned loop of plastic strapping and more particularly to a machine which secures the overlapping ends of the strapping with a tension resisting heat seal.

As a subtitute for the well-known steel band strapping, there have recently been developed high strength strapping materials formed of such long chain linear polymers or plastics as polypropylene and nylon. Such strapping material is made by extruding the molten polymer through an orifice and then either stretching or cold rolling the extruded product to orient the molecules longitudinally thereof with resultant greatly increased tenacity and tensile strength. In securing overlapping ends of plastic strapping by means of a heat seal, special techniques are required in order to avoid disorientation of the molecules and consequent loss of strength. Strapping of this nature also requires, at least for fully satisfactory results, special apparatus for feeding, tensioning, cutting and other handling operations. This type of strapping will be referred to herein as plastic strapping and it is toward a machine for handling such strapping that the present invention is directed.

It is the over-all object of the present invention to provide an automatic machine for lacing a length of plastic strapping about an object, tensioning the strapping, securing overlapping strap portions together by means of a heat seal and cutting the secured strap from the supply at a point closely adjacent the heat seal.

A further object of the invention is to provide improved apparatus for heat sealing overlapping ends of tensioned plastic strapping in a manner to obtain a joint having a high degree of efficiency.

Other and further objects, features and advantages of the invention as well as mechanisms ancillary thereto and subcombinations thereof will be explained or will become apparent as the description of the preferred embodiment proceeds.

Referring now to the drawing:

FIG. 1 is a vertical section through the machine;

FIG. 2 is a diagrammatic side elevational view of the machine;

FIG. 3 is a section taken along the line III—III of FIG. 2;

FIG. 4 is a section taken along the line IV—IV of FIG. 2;

FIG. 5 is a section taken along the line V—V of FIG. 2;

FIG. 6 is a fragmentary view showing the location of one of the switches used to control the machine;

FIG. 7 is a vertical section showing a portion of the operating mechanism of the sealing unit;

FIG. 8 is a sectional view showing a portion of the strap gripping and cutting mechanism;

FIG. 9 is a fragmentary sectional view showing the drive for the cams that operate the members shown in FIG. 8;

FIG. 10 is a section taken along the line X—X of FIG. 1;

FIG. 11 is a side elevational view of a switch and switch operating lever;

FIG. 12 is a fragmentary elevational view showing a cam that operates the strap gripping members;

FIG. 13 is a fragmentary elevational view showing a cam for operating a strap cutting and seal squeezing member; and FIG. 14 is a schematic wiring diagram.

Referring first of FIG. 2, the machine comprises a base section 10 containing the various operating mechanisms. The top of base 10 forms a table 12 on which a package 14 to be strapped may be rested within the confines of a yoke 16 extending upwardly from the base section. A roll 18 of plastic strapping is suitably mounted alongside the machine and the strapping 20 from the roll is directed about guides 22 to a point near the right hand lower corner of yoke 16 where it is engaged with a feeding and tensioning mechanism as will presently be explained for push feeding the strap through the yoke.

As shown in section in FIGS. 3, 4 and 5, yoke 16 is formed of a channel member or members having an open side facing inwardly of the loop formed by the yoke. Along the straight arms of the yoke, that is the two vertical sides and the horizontal top, track forming spacers 24, one of which is shown in FIGS. 4 and 5, are secured by means of screws 26 to one of the inner faces of the channel members. Extending through spacers 24 and the adjacent side of the channel member are a plurality of bolts 28 surrounding which are springs 30 which hold an angle member 32 resiliently against one face of the spacer as shown in FIG. 5. One edge of angle member 32 is curved to fit into a groove 34 extending along the wide face of spacer 24 and an arm 36 of the angle member is spaced from the narrow face of the spacer so as to slidably and guidingly confine strap 20 to the contour of yoke 16 as the strap is push-fed therearound. As will presently be explained, the strap is fed around the yoke so as to form a strap loop prior to the placement of the package in strapping position and the arms 36 of the angle members not only serve to guide the strap but to support it against the yoke until such time as the loop is drawn tight about the package. During the actual strapping operation, as the strap is tensioned it presses outwardly against the arms 36 and springs 30 yield to permit the angle members to pivot about the respective grooves 34 whereby the arms 36 release the strap and permit it to escape from the yoke and be drawn down against the package. It is not necessary to confine the strap at the corners of the yoke and in the corners, curved guide tracks, one of which is indicated at 38 in FIG. 3, are provided. A guide plate 40 is secured to track 38 but this plate does not overlie the face of the strap as do the angle members 32.

Referring now to FIG. 1; from the last of the guide rollers 22 strap 20 passes through a slot 42, part way about a roller 44, thence about the major portion of the periphery of a feed wheel 46 having a smooth or slightly roughened surface, part way about a roller 48 and into a guide slot 50 leading toward the table 12. Wheel 46 is secured to a shaft 52 to which is also secured a pulley or sprocket wheel 54 connected through a drive belt or roller chain 56 to a reversible air motor 58, whereby wheel 46 may be rotated in opposite directions.

Rollers 44 and 48 are mounted for free rotation on shafts 60 and 61 respectively which are secured between a pair of bell crank levers 62, only one of which is shown. Shaft 60 extends through an elongated slot 63 in a stationarily mounted block 65 and shaft 61 extends through an elongated slot 67 in said block, the slots 63 and 67 being oppositely sloped as indicated in FIG. 1. The bell crank levers and the rollers 44 and 48 are thus floatingly mounted to a limited degree. Downwardly extending operating arms of bell crank levers 62 are connected to the piston 64 of a double acting air cylinder 66.

When strap is to be fed around yoke 16, air motor 58 is driven in the direction to cause the wheel 46 to turn clockwise, as viewed in FIG. 1, and simultaneously, air is admitted to cylinder 66 so as to rock bell crank levers 62 counterclockwise to thereby pinch the strap between wheel 46 and roller 48. Since the strap is wrapped about a considerable part of wheel 46 before being pinched by roller 48, a large area of contact is assured between driving wheel 46 and the strap so that localized friction which could damage the strap is avoided. Localized friction could be particularly harmful to molecularly oriented plastic strapping inasmuch as the heat produced thereby could result in loss of molecular orientation of the strap. When the strap is to be tightened about the package, air motor 58 is driven in the direction to rotate wheel 46 counterclockwise and simultaneously, double acting air cylinder 66 is operated so as to rock bell crank levers 62 clockwise to cause the strap to be pinched between wheel 46 and roller 44. It is during the tightening or tensioning of the strap that the large area of contact between the strap and the surface of wheel 46 is particularly important inasmuch as it is during tensioning that the strap offers the greatest resistance to movement and consequently the greatest opportunity to overheating.

From guide slot 50 the end of the strap passes through a slot 68 provided in a strap gripping member 70 which is pivotally mounted at 72. From slot 68 the strap proceeds between a heavy cantilever section 74 of table 12 and a strap gripping end 76 of a member 78 which is pivotally mounted at 80 on the machine framework and thence into a groove 82 (see also FIG. 10) which is cut into the surface of table 12 and which is covered by a retractable member 84 whereby the strap is properly guided into the lower left hand corner of the yoke 16. As the strap end leaves the lower right hand end of the yoke it passes between a plate 85 (see also FIG. 7) extending part way across an open slot in the top of table 12 and a gripping portion 86 of the pivotally mounted member 70 and finally engages the upper end of a switch operating lever 88.

As shown in FIG. 11, lever 88 is pivotally mounted at 99 and has an arm 92 overlying an operating member 94 of a switch 96. As will presently be explained, when the end of the strap engages lever 88 so as to rock said lever counterclockwise as shown in the drawings, switch 96 is effective to open an electric circuit to a solenoid valve which stops air motor 58 whereby feeding of the strap is discontinued.

With the strap thus formed into a loop extending across table 12 and through the yoke 16, the machine is conditioned for performing the strapping operation and after the package is positioned on the table, an air motor 100 is started. Motor 100 is connected through a speed reduction unit 101 and a roller chain 102 to a sprocket 104 secured to a main drive shaft 106 for controlling the various functions of the machine.

Drive shaft 106 is rotated in counterclockwise direction as viewed in FIGS. 1, 12 and 13 and secured to said shaft is a cam 108 having a segment 110 of reduced diameter. When the machine is at rest, cam follower rollers 112 and 114 lie against the low segment of the cam. Roller 112 is mounted on the free end of an arm 116 pivotally mounted on the framework at 120 and articulated through a connection comprising a compression spring 122 to member 70. A spring 124 (see FIGS. 7 and 8) extending between a pin 126 on arm 116 and a fixed anchor pin 128 urges the free end of arm 116 downward so as to hold the roller 112 in contact with the surface of cam 108. As shaft 106 starts to turn, roller 112 almost immediately moves onto the high portion of the cam thereby rocking arm 116 so as to compress spring 122 and through said spring swing member 70 upward to pinch or grip the strap between plate 85 and portion 86 of member 70. This effectively anchors the free end of the strap.

A cam 130 (see FIG. 7) is secured to shaft 106 and right after the shaft has turned sufficiently to cause the strap to be gripped between plate 85 and portion 86 of member 70 as aforesaid, cam 130 operates the switch 132 of a solenoid operated valve 133 (see FIG. 14) to start air motor 58 to turn in the direction to retract the strap and tension the same about the package. Valve 133 also admits air to one end of a cylinder 134 (see FIG. 10) so as to cause the piston 136 of said cylinder to rotate a gear segment 138 in clockwise direction. Gear segment 138 is meshed with a rack 140 cut into the retractable strap track cover 84 and thus as the tensioning of the strap begins, cover 84 is slid away from the strap so that it may move up into contact with the bottom of the package. There is a manually operated pressure regulating valve in the line leading to motor 58 and when the torque of the motor reaches the value provided by the preselected pressure, the motor stalls, thus determining the amount of tension applied to the strap. The amount of tension will normally be regulated in accordance with the type of package. Thus for a soft package, a light tension will usually be called for whereas higher tensions will be used when strapping firm or hard objects.

When the article being strapped is small it of course takes more time to shrink the strap loop into conformity therewith than when the article more nearly conforms to the size of yoke 16. To assure sufficient strap tensioning time to handle small articles, motor 100 is stopped at the time motor 58 is started and motor 100 is not restarted until near the end of the tensioning operation. This will be more fully explained later, but briefly the action is accomplished by means of a cam 142 on shaft 106 (see FIGS. 7 and 14) which causes a switch 144 to open a circuit to a solenoid operated valve 146 in the line leading to motor 100 at the same time that cam 130 is closing switch 132 to start motor 58 as aforesaid. A switch 148 (see FIGS. 1 and 6 and 14), in conjunction with switch 144, re-establishes a circuit to solenoid valve 146 as the strap is pulled out of the lower right hand corner of the yoke. Since the strap end is held near this corner of the yoke, tension applied by wheel 46 is transmitted last to the part of the strap in the vicinity of switch 148 so that the tensioning operation is nearly completed when motor 100 is restarted.

As motor 100, drive shaft 106 and cam 108 again begin to turn, cam follower 114 rides onto the high part of said cam. Roller 114 is carried on the free end of a lever 150 pivotally mounted on a rod 152 and articulated through a compression spring 154 to the pivotally mounted member 78. A spring 156 (see FIGS. 7 and 8) extending between a pin 158 in lever 150 and a fixed pin 160 holds roller 114 against the periphery of cam 108 at all times. As roller 114 moves onto the high part of said cam, the resultant motion of lever 150 is transmitted through spring 154 to member 78, thereby swinging said member about its pivot and causing the end 76 thereof to pinch the strap against the heavy section 74 of table 12.

Between switch operating lever 88 and the point where the strap is gripped between plate 85 and gripping portion 86 of member 70, overlapping but spaced apart strap portions are provided, the end portion of the strap being held away from the underlying portion a distance equal to the space between the gripping surface of gripping portion 86 and the slot 68 (see FIG. 1).

Swingably mounted on a pin 162 secured to the framework is a lever 164 (see particularly FIGS. 1 and 7) carrying a cam following roller 166. A spring 168 extending between a pin 170 secured in lever 164 and a fixed anchor 172 urges said lever in the direction to maintain roller 166 in contact with a face cam 174 which is secured to or formed integrally with the heretofore referred to cam 108. For the most part roller 166 rides a high surface of cam 174 but immediately after cam 108 actuates the lever 150 a low surface of cam 174 is presented to the roller and spring 168 thereupon becomes effective to rock lever 164 from the dotted line position shown in FIG. 7 to the full line position. At its upper end lever 164 has secured thereto and insulated therefrom a resistance heating element 176 including a thin blade-like portion 178. Wires 180 partially shown in FIG. 7 supply an electric current to the heating element which is maintained hot at all times the machine is in use. When lever 164 is rocked as aforesaid, blade 178 enters into the space between the overlapping strap portions between lever 88 and gripping member 86.

As best shown in FIG. 9, a cam 182 is mounted on a hub 184 of cam member 108 and the two cams are secured together for unitary rotation by means of screws 186 or otherwise. As indicated in FIG. 13, a cam follower roller 188 rides the surface of cam 182. Roller 188 is carried on the free end of an arm 190 which is pivotally mounted on the rod 152. A spring 192 extending between a pin 194 secured in arm 190 and a fixed anchor pin 196 (see FIG. 7) urges the arm downward to keep the follower roller 188 in contact with the surface of cam 182. Arm 190 is connected through a compression spring, not shown but similar to spring 154, to a lever 198. Lever 198 is pivotally mounted on the same pivot 80 which carries member 78. As shown in FIG. 1, lever 198 is longer than member 78 and is provided with a head portion 200 which extends in front of member 78 in alignment with the overlapping portions of the strap.

As soon as the heated blade 178 enters between the overlapping strap portions as aforesaid, a high surface 202 of cam 182 is presented to follower 188 and the follower moves from a low or radially inward surface 204 of the cam onto the high surface thereof. This results in rocking lever 198 upward and consequently in rocking lever 198 to cause the head portion 200 thereof to squeeze the overlapping strap portions against the hot blade 178. An edge of head portion 200 and the edge between gripper 86 and slot 68 co-operate to cut the strap at that point as head portion 200 moves to strap squeezing position. At a point in time between the gripping of the strap by members 74 and 76 and the operation of lever 198, cam 130 becomes effective to stop motor 58 so that there is no tension on the strap at the time it is cut. This is important because unless motor 58 were stopped, the tensioning wheel 46 would completely unlace the strap after it was cut. It is also important that the strap not be under tension at the place of the cut because the highly molecularly oriented strap will split longitudinally when it is cut while under tension and such splitting would interfere with the subsequent feeding of the strap through the yoke.

The low portion of face cam 174 encompasses only a very small arc and consequently very shortly after the overlapping strap portions are squeezed against hot blade 178, cam 174 is effective to swing lever 164 back to the dotted line position shown in FIG. 7 and thus remove the hot blade so that head portion 200 may move the heated strap portions into direct engagement. When the plastic strap is made of polypropylene resin, blade 178 is maintained at a temperature of about 750° F. and is allowed to remain between the strap portions for only a fraction of a second. This is sufficient to soften or melt the faces of the strap so that the strap portions fuse together upon contact. It is essential that only the surface areas of the strap be melted for otherwise the entire cross section of the strap will become molecularly unoriented and the fused joint will be deficient in tensile strength. By melting the strap portions to a depth of only a minor part of the cross section molecular disorientation of the major part of the cross section is avoided and the joint thus produced has 80% or more of the strength of the strap itself. Other types of plastic straps may be heat sealed in a similar manner but the blade temperature and to a lesser extent the time that the blade is allowed to remain between the overlapping strap portions need to be varied in accordance with the particular plastic.

After blade 178 is removed, shaft 106 continues to turn and cam 108 continues to cause the strap to be gripped between members 85 and 86 and between members 74 and 76. This condition is maintained until near the end of the cycle when cam follower rollers 112 and 114 drop onto the low segment 110 of the cam. Cam 182 also continues to cause the overlapping strap portions to be squeezed together by the head 200 of lever 198 until near the end of the cycle when follower 188 returns to the low segment 204 of the cam. The cycle is long enough so that the squeezing force of head 200 is maintained until the heated strap portions have cooled but this only requires about two seconds since the strap has been melted to only a very shallow depth. By maintaining the grip on the strap at 74, 76 and 85, 86 no tension is applied to the strap joint until it has been cooled. The tension in that section of the strap between wheel 46 and the point where it is gripped between members 74 and 76 is of course removed when the strap is cut as aforesaid.

Right after cams 108 and 182 have permitted release of the strap, a high point 206 of cam 142 (see FIG. 14) operates switch 144 in a manner to break the circuit to the solenoid valve controlling air motor 100 and said motor thereupon stops. The package is then removed by sliding the strap sideways from beneath plate 85 and the heavy section 74 of the table 12. The act of removing the strapped package relieves the pressure on switch operating lever 88 and as will presently be explained this causes the motor 58 to be started in strap feeding direction whereby strap is again fed through the yoke to condition the machine for the next strapping operation.

Referring now particularly to FIG. 14, the machine is preliminarily conditioned for operation by closing the contact blades 208 and 210 of a toggle switch whereby a circuit is established from power line 212 through leads 214 and 216 to the input of a transformer 218 the output of which is connected to the heating element 176. The contact blades 220 and 222 of a second toggle switch are then closed and the machine is then fully conditioned. If at this time the strap is not threaded through the yoke 16 so that the strap end is bearing against lever 88, switch 96 is making contact between a line 224 and a line 226. Line 226 leads to a solenoid operated valve 228 which when energized causes strap feeding and tensioning motor 58 to run in the strap feeding direction and also admits air to cylinder 134 so as to move strap track cover 84 to the position shown in FIG. 10. Solenoid valve 228 is connected through leads 230 and 232 back to the power line and thus when switch 96 connects lines 224 and 226 strap is fed through the yoke as previously described until the end of the strap strikes switch operating lever 88. Lever 88 then operates switch 96 to break the connection between lines 224 and 226 and establish a connection between line 224 and a line 234.

When the strap is within the yoke it bears against an operating member 235 (see FIG. 6) of switch 148 and causes said switch to establish a connection between line 234 and a line 236 leading to one side of a push button starter switch 238. The other side of switch 238 is connected to the power line through a line 240 containing a relay 242 having a set of contacts 244 arranged to maintain the circuit between lines 236 and 240 after push button switch 238 is released by the operator. Line 240 is connected through a line 246 to one of the contacts of the switch 144 another of the contacts of which is connected through a line 248 to the solenoid valve 146 controlling main drive motor 100. Solenoid valve 146 is also connected to the power line through a lead 250 and the line 232. When the machine is at rest, cam 142 holds switch 144 in the condition indicated in FIG. 14 so as to form a connection between lines 246 and 248.

After positioning the package within the confines of the yoke, the push button starter switch 238 is closed thus establishing a circuit to the solenoid valve 146 of the main drive motor 100 through lines 224, 234, 236, 240, 246, 248, 250 and 232. Motor 100 then begins to drive the main drive shaft 106 carrying the various control cams as hereinbefore described. When cam 130 reaches the rotated position wherein it operates switch 132, said switch is caused to close a circuit between a line 252 connected to line 234 and a line 254 leading to the solenoid valve 133 which when energized causes motor 58 to operate in strap tensioning direction and also causes strap track cover 84 to be withdrawn. Solenoid valve 133 is connected to the power line through a line 256 and the line 232 so that said valve is energized when switch 132 closes the circuit between lines 252 and 254.

At the moment that cam 130 effects the starting of motor 58 or immediately thereafter, the high surface 206 of cam 142 passes beyond the operating member of switch 144 and the switch then breaks the connection between lines 246 and 248 and establishes a connection between line 248 and a line 258. With the switch 144 open between lines 246 and 248, solenoid valve 146 is de-energized and main drive motor 100 stops. Motor 58 however continues to operate to effect the tightening of the strap about the package.

As previously mentioned, the last part of the strap to be pulled out of the yoke is that portion in the vicinity of the operating arm 235 of switch 148. When this happens, switch 148 breaks the connection between lines 234 and 236 and establishes a connection between lines 234 and 238. This action of switch 148 energizes the solenoid 146 through lines 224, 234, 258, 248, 250 and 232. The breaking of the connection between lines 234 and 236 also de-energized relay 242 and opens the circuit between lines 236 and 240. Motor 100 then again begins to drive shaft 106 carrying the various operating cams with the previously explained results. At the end of the cycle, the high surface 206 of cam 142 repositions switch 144 to the condition shown in the diagram, thus de-energizing solenoid valve 146 and stopping motor 100.

When the strapped package is removed, switch 96 establishes the circuit to solenoid valve 228 thus feeding strap through the yoke as aforesaid and the machine is then conditioned for the next strapping operation.

The greater part of the apparatus may be used without the yoke 16 and this may be particularly desirable when strapping packages of such large size that the provision of a yoke is impractical. Without the yoke, the machine becomes less automatic and in this event solenoid valve 228 is removed from the circuit and provision is made for the operator to manually control the feeding of the strap. However, after manually causing the desired amount of strap to be fed, the operator inserts the end of the strap into the space between plate 85 and strap gripper 86 and shoves the end against switch operating lever 88 to thereby condition the machine for performing the various other functions upon subsequent operation of starter switch 238.

Having thus described a preferred embodiment of the invention, what is claimed is:

1. Apparatus for securing a tensioned plastic strap about an article, said apparatus comprising means for supporting an article in strapping position, gripping means for holding the leading end of a strap looped about the article in relaxed spaced overlapping relationship with respect to a strap portion extending to a supply, tensioning means for tensioning the strap about the article, holding means for holding the strap under tension about the article, means for melting the facing surface areas of the overlapping strap portions, squeezing means for squeezing the melted surface areas together whereby a fused joint is formed, and cutting means for cutting the strap from the supply adjacent the fused joint.

2. The apparatus set forth in claim 1 wherein said cutting means comprises cooperating edges on said gripping means and said squeezing means.

3. Apparatus for securing a tensioned plastic strap about an article, said apparatus comprising means for supporting an article in strapping position, gripping means for holding the leading end of a strap looped about the article in relaxed spaced overlapping relationship with respect to a strap portion extending to a supply, tensioning means for tensioning the strap about the article, holding means for holding the strap under tension about the article, said holding means being located so that the overlapping strap portions are between said holding means and said tensioning means, means for disengaging said tensioning means whereby the strap is relaxed between said holding means and said tensioning means, means for melting the facing surface areas of the overlapping strap portions, squeezing means for squeezing the melted surface areas together whereby a fused joint is formed, and cutting means for cutting the strap from the supply adjacent the fused joint.

4. The apparatus set forth in claim 3 wherein said cutting means comprises cooperating edges on said gripping means and said squeezing means.

5. The apparatus set forth in claim 3 comprising strap feeding means, and means for guiding the leading end of the strap from said feeding means to said gripping means.

6. Apparatus for securing a tensioned plastic strap about an article, said apparatus comprising means for supporting an article in strapping position, gripping means for holding the leading end of a strap looped about the article in relaxed spaced overlapping relationship with respect to a strap portion extending to a supply, tensioning means for tensioning the strap about the article, holding means for holding the strap under tension about the article, a heating element, means for inserting said heating element into the space between the overlapping strap portions, squeezing means for squeezing the overlapping strap portions against said heating element to effect a melting of the surfaces of the strap in contact with the heating element, and means for withdrawing said heating element from between said overlapping strap portions to permit said squeezing means to force the melted surfaces of the strap together whereby a fused joint is formed.

7. Apparatus for securing a tensioned plastic strap about an article, said apparatus comprising means for supporting an article in strapping position, gripping means for holding the leading end of a strap looped about the article in relaxed spaced overlapping relationship with respect to a strap portion extending to a supply, tensioning means for tensioning the strap about the article, holding means for holding the strap under tension about the article, said holding means being located so that the overlapping strap portions are between said holding means and said tensioning means, means for disengaging said tensioning means whereby the strap is relaxed between said holding means and said tensioning means, a heating element, means for inserting said heating element into the space between the overlapping strap portions, squeezing means for squeezing the overlapping strap portions against said heating element to effect a melting of the surfaces of the strap in contact with the heating element, means for withdrawing said heating element from between said overlapping strap portions to permit said squeezing means to force the melted surfaces of the strap together whereby a fused joint is formed, and means for cutting the strap from the supply adjacent said fused joint.

8. The apparatus set forth in claim 7 wherein the means for cutting the strap comprises cooperating edges on said squeezing means and said gripping means.

9. In a strapping machine wherein a plastic strap is formed into a loop with the free end thereof overlapping and spaced from a portion of the strap extending to a supply, a main drive shaft, a main motor for driving said shaft, strap tensioning apparatus, an air motor for driving said tensioning apparatus, means for starting said main motor, strap gripping means for holding the free end of the strap stationary, means on said drive shaft for operating said strap gripping means, means on said drive shaft for starting said air motor to effect a tensioning of the strap, means for stopping said main motor when said air motor is started, means for restarting said main motor prior to the completion of the tensioning operation, a heating element having a home position, means for moving said heating element from its home position to a position between the overlapping strap portions, squeezing means, means on said main drive shaft for causing said said squeezing means to squeeze the overlapping strap portions against said heating element to effect a softening of the face areas of the strap in contact with the heating element, means for restoring said heating element to home position whereby said squeezing means may squeeze the softened faces of the strap together to effect a fused joint, means for cutting the strap from the supply adjacent the joint, and means operable by said main drive shaft for stopping said main motor.

10. The apparatus set forth in claim 9 comprising holding means for holding the strap under tension, said holding means being so located that the overlapping strap portions are between said holding means and said tensioning apparatus, means on said main drive shaft for operating said holding means prior to operation of said heating element, and means for stopping said air motor after operation of said holding means whereby the strap is relaxed between said holding means and said tensioning apparatus.

11. In a strapping machine wherein a plastic strap is formed into a loop with the free end thereof overlapping and spaced from a portion of the strap extending to a supply, a support for supporting an article within the confines of the strap loop, gripping means for holding the free end of the strap stationary, tensioning means for tensioning the strap loop about the article, said tensioning means comprising a wheel about a major portion of the periphery of which the strap passes and an air motor for driving said wheel, means for admitting air to said motor to cause the tensioning of the strap, holding means for holding the strap under tension, said holding means being located so that the overlapping strap portions are between the holding means and said wheel, means for stopping the flow of air to said motor whereby the tension in the strap is relaxed between said holding means and said wheel, a heating element movable from a home position to a position between the overlapping strap portions, squeezing means for squeezing the overlapping strap portions against said heating element to cause the faces of the strap in contact with said heating element to soften, means for moving said heating element back to home position to permit said squeezing means to squeeze the softened faces of the strap together to effect a fused joint, said squeezing means and said gripping means having cooperating edges effective to cut the strap therebetween when said squeezing means is operated.

12. Apparatus for securing a tensioned strap about an article, said apparatus comprising a support for supporting an article in strapping position, guide means for guiding a strap through a loop within the confines of which the article rests when in strapping position, gripping means for holding the leading end of the strap in spaced overlapping relationship with respect to another portion of the strap, a strap feeding and tensioning wheel mounted adjacent said support for rotation about a horizontal axis, first and second guide rollers for directing the strap about the major portion of the periphery of said wheel, said first guide roller being located on that side of the vertical axis of said wheel toward said support and said second guide roller being located on the other side of the vertical axis of said wheel, reversible drive means for rotating said wheel in strap feeding direction to feed strap through said guide means to said gripping means and in tensioning direction to tighten the strap about the article, means for moving said first guide roller toward said wheel to pinch the strap therebetween when said wheel is rotated in strap feeding direction and to move said second guide roller toward said wheel to pinch the strap therebetween when said wheel is rotated in strap tensioning direction, means for securing the overlapping portions of the strap together, and means for cutting the strap between the overlapping portions and said feeding and tensioning wheel.

13. Apparatus for securing a tensioned plastic strap about an article, said apparatus comprising a support for supporting an article in strapping position, guide means for guiding a strap through a loop within the confines of which the article rests when in strapping position, gripping means for holding the leading end of the strap in spaced overlapping relationship with respect to another portion of the strap, a strap feeding and tensioning wheel mounted adjacent said support for rotation about a horizontal axis, first and second guide rollers for directing the strap about the major portion of the periphery of said wheel, said first guide roller being located on that side of the vertical axis of said wheel toward said support and said second guide roller being located on the other side of the vertical axis of said wheel, reversible drive means for rotating said wheel in strap feeding direction to feed strap through said guide means to said gripping means and in tensioning direction to tighten the strap about the article, means for moving said first guide roller toward said wheel to pinch the strap therebetween when said wheel is rotated in strap feeding direction and to move said second guide roller toward said wheel to pinch the strap therebetween when said wheel is rotated in strap tensioning direction, a heating element, means for moving said heating element to a position between the overlapping strap portions, squeezing means for squeezing the overlapping strap portions against said heating element, means for withdrawing said heating element from between said overlapping strap portions after the face areas of said strap portions have been softened, said squeezing means squeezing the softened face areas of the strap together to produce a fused joint, and means for cutting the strap between the fused joint and said strap feeding and tensioning wheel.

14. Strap feeding and tensioning mechanism comprising a wheel mounted for rotation on a horizontal axis, first and second rollers mounted near horizontally adjacent quadrants of said wheel whereby a strap may be trained about said rollers and a major portion of the periphery of said wheel, means for rotating said wheel in strap feeding direction to move the strap toward said first roller and in strap tensioning direction to move the strap toward said second roller, means for moving said first roller toward the periphery of said wheel to pinch the strap thereagainst when said wheel is rotated in strap feeding direction and means for moving said second roller toward the periphery of said wheel to pinch the strap thereagainst when said wheel is rotated in strap tensioning direction.

15. In an automatic strapping machine, a strapping station, a strap feeding wheel mounted for rotation on a horizontal axis and about a major portion of the periphery of which strap from a supply is directed, means for rotating said wheel in forward direction to feed the strap toward the strapping station and in reverse direction to withdraw strap from the strapping station and tension the same about an object located at the strapping station, a first strap guiding roller located adjacent the periphery of said wheel on that side of the horizontal axis of the wheel toward the strapping station, means for moving said roller toward the periphery of the wheel to force the strap against said wheel when said wheel is rotated in forward direction, a second strap guiding roller located adjacent the periphery of the wheel on that side of the horizontal axis of the wheel away from the strapping station and means for moving said second roller toward the periphery of the wheel to force the strap against the wheel when said wheel is rotated in reverse direction.

References Cited by the Examiner

UNITED STATES PATENTS

| | | | |
|---|---|---|---|
| 2,741,885 | 4/1956 | Allison | 53—198 |
| 3,012,497 | 12/1961 | Fryer | 100—31 X |
| 3,033,102 | 5/1962 | Fryklund | 100—14 |
| 3,086,451 | 4/1963 | Van Der Wal | 100—26 |
| 3,118,365 | 1/1964 | Rollo et al. | 100—33 X |
| 3,146,695 | 9/1964 | Van De Bilt | 100—4 |
| 3,186,891 | 6/1965 | Gelling et al. | 156—510 X |

FOREIGN PATENTS

| | | |
|---|---|---|
| 1,334,016 | 6/1963 | France. |
| 516,432 | 1/1940 | Great Britain. |
| 805,765 | 12/1958 | Great Britain. |

WALTER A. SCHEEL, *Primary Examiner.*

IRVING BUNEVICH, BILLY J. WILHITE, *Examiners.*